UNITED STATES PATENT OFFICE.

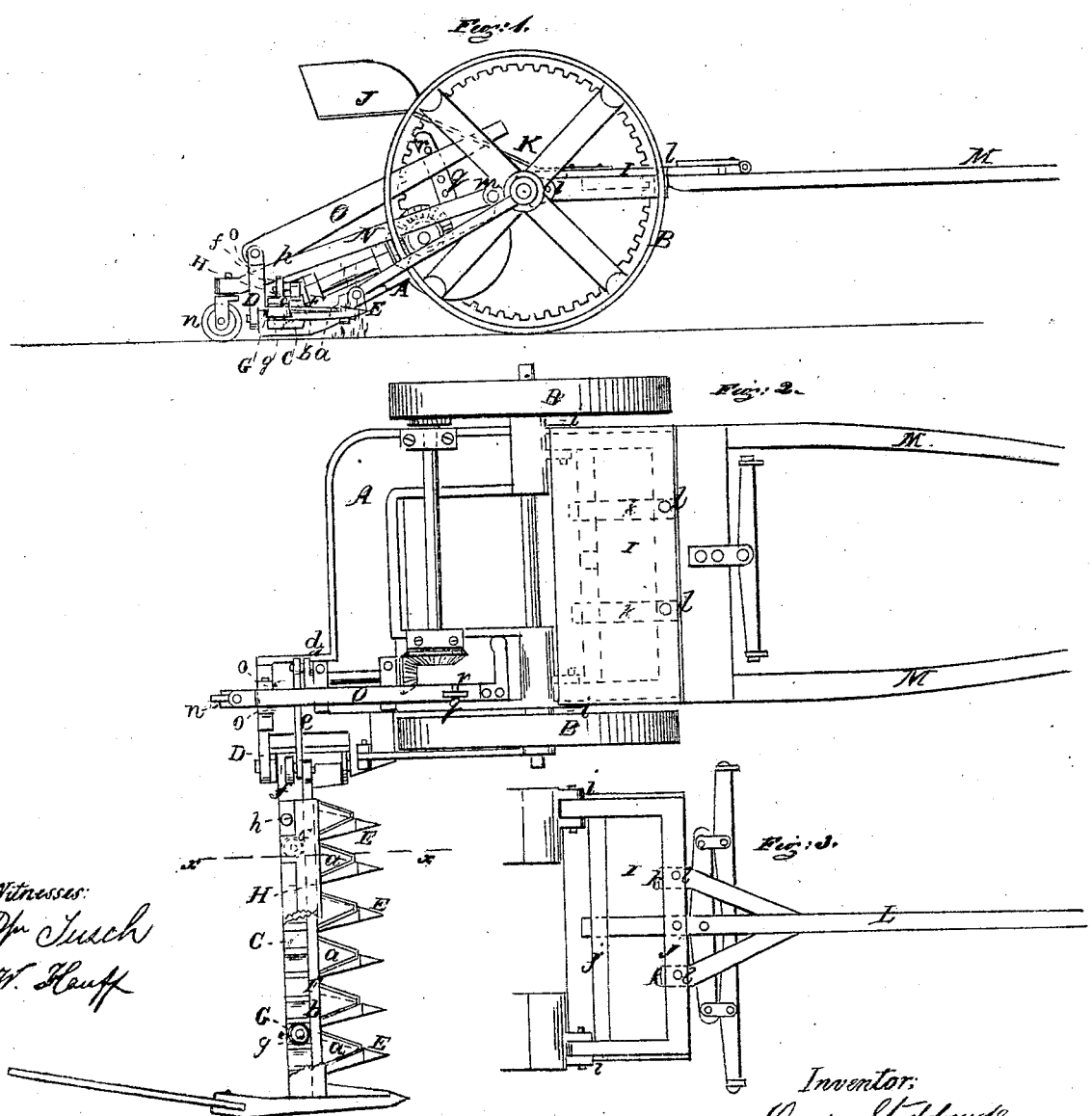

OREN STODDARD, OF BUSTI, NEW YORK.

IMPROVEMENT IN HARVESTERS.

Specification forming part of Letters Patent No. 22,312, dated December 14, 1858.

*To all whom it may concern:*

Be it known that I, OREN STODDARD, of Busti, in the county of Chautauqua and State of New York, have invented a new and Improved Grass and Grain Harvester; and I do hereby declare that the following is a full, clear, and exact description of the same, reference being had to the annexed drawings, making a part of this specification, in which—

Figure 1 is a side sectional view of my invention, taken in the line $x\,x$, Fig. 2. Fig. 2 is a plan or top view of the same. Fig. 3 is an inverted plan of a portion of the same.

Similar letters of reference indicate corresponding parts in the several figures.

This invention consists in the employment or use of conical rollers, attached to the finger-bar and used in connection with a sickle-bar having an oblique or beveled back, and also used in connection with a cap-plate, the whole being arranged as hereinafter fully shown and described, whereby the points or front parts of the sickle-teeth are made, by the action of the grass or grain being cut, or by the resistance offered by the grass or grain to the forward movement of the machine, to bind or bear snugly on the front parts of the fingers, and thereby greatly add to the efficiency of the cutting device.

To enable those skilled in the art to fully understand and construct my invention, I will proceed to describe it.

A represents the main frame of the machine, which is mounted on wheels B B, and C is the finger-bar, which is attached to the main frame A by a joint, D, to admit of the ready rising and falling of the outer part of the finger-bar independently of the main frame.

E are fingers attached to the bar C, and F is the sickle, the teeth $a$ of which are of the usual V or saw-tooth form, as shown clearly in Fig. The sickle-bar $b$, to which the teeth $a$ are attached, has its back side, $c$, inclined or beveled, as shown clearly in Fig. 1, the upper edge projecting over or farther back than the lower edge. The sickle-teeth $a$ rest on the fingers E; but the sickle-bar $b$ may rest on the front part of the finger-bar or on the back parts of the fingers. The sickle is driven by a crank, $d$, and connecting-rod $e$, motion being communicated to the crank-shaft from one of the traction-wheels by any suitable arrangement of gearing, it being preferable to have the driving-crank $d$ as nearly in a horizontal line with the sickle as possible. The inner end of the sickle-bar, to which the connecting-rod $e$ is attached, is provided with a friction-roller, $f$, which rests on the inner end of the finger-bar, and serves to diminish much friction which would otherwise occur by the oblique pull and thrust of the crank $d$.

On the finger-bar C rollers G are placed. Two of these rollers are shown as being applied to the finger-bar in Fig. 2; but more may be used, if desired. These rollers are fitted loosely on vertical pins $g$, attached to the finger-bar, and consequently are in a horizontal or approximate position. The rollers G are of conical form—that is to say, their peripheries are inclined so that their upper surfaces will be of less diameter than their lower surfaces.

H is the cap-plate, which is secured by screws $h$, or otherwise properly fastened to the finger-bar C. The front part of this plate is recessed, swaged, or otherwise formed to cover the sickle-bar $b$, as shown clearly in Fig. 1, and the back part rests snugly on the finger-bar on the fingers, with the exception of two recesses to receive the rollers G G.

To the front part of the main frame A a foot-piece, I, is attached by joints $i\,i$, as shown more particularly in the inverted sectional plan, Fig. 3. To the foot-piece I the driver's seat J is attached by inclined bars K K, one of which is shown in Fig. 1. The foot-piece I is formed of a rectangular frame covered by a platform. The two traverse-bars $j\,j$ of the frame are mortised to receive the tenons $k$ of either the draft-pole L or the shafts M. The tenons $k$ are secured in the foot-piece by pins $l$, which pass through the front traverse-bar $j$ of the foot-piece. By this simple arrangement either the draft-pole or shafts may be readily attached to or detached from one and the same machine.

I would remark that the finger-bar and sickle may be raised and lowered in order to clear obstructions, and also to regulate the height the crop is to be cut, by means of levers N O, the lever N being connected by a joint, $m$, to the main frame at or near its front end, and the back end of said lever having a caster-wheel, $n$, attached to it. The back end of the lever O is secured between uprights $o\,o$, attached to the inner end of the finger-bar, said lever bearing or resting on the lever N, as shown at $p$, and having a mortise made through it near its front end to allow a curved guide-bar, $q$, to pass through, said bar $q$ being perforated with holes to receive a pin, $r$, to regulate the height of the finger-bar and sickle. This will be understood by referring to Fig. 1.

The operation is as follows: As the machine is drawn along the grass or grain in offering a resistance to the forward movement of the sickle F will cause the back-inclined edge $c$ of the sickle-bar $b$ to bear against the conical or inclined faces or peripheries of the rollers G G. This pressure of course has a tendency to throw up the sickle-bar $b$ and force or press down the front parts of the teeth $a$ snugly on the fingers E, the cap-plate H serving as a bearing for the bar $b$ and insuring the pressing down of the front parts of the teeth $a$. By this arrangement the rollers $f$ effect a twofold purpose—to wit, they act in the capacity of friction-rollers, and also as sickle-adjusters to add to or augment its cutting capacity and prevent the choking or clogging of the same—a contingency due to imperfect cutting.

I am aware that friction-rollers have been applied to the finger-bars of harvesters in order to diminish the friction attending the operation of the sickle, but so far as I am aware for this purpose only.

I am also aware that levers arranged similarly to those herein shown and described for regulating the height of the sickle have been previously used. I therefore do not claim broadly the application of friction-rollers to a finger-bar and sickle when viewed merely as such, irrespective of the other function hereinbefore described. Neither do I claim the levers N O for raising and lowering the finger-bar and sickle; but,

Having thus described my invention, what I claim as new, and desire to secure by Letters Patent, is—

The conical rollers G G, two or more, attached to the finger-bar C, in connection with the sickle-bar $b$, provided with an inclined back, and the cap-plate H or its equivalent, the whole being arranged to operate substantially as and for the purpose set forth.

OREN STODDARD.

Witnesses:
WM. TUSCH,
W. HAUFF.